US010450448B2

United States Patent
Coulter et al.

(10) Patent No.: US 10,450,448 B2
(45) Date of Patent: Oct. 22, 2019

(54) SEALING COMPOUNDS WITH SCAVENGER MATERIALS OF SMALL PARTICLE SIZE

(71) Applicant: Actega DS GmbH, Bremen (DE)

(72) Inventors: William David Coulter, Konolfingen (CH); Rüdiger Wittenberg, Bremen (DE)

(73) Assignee: Actega DS GmbH, Bremen (DE)

( * ) Notice: Subject to any disclaimer, the term of this patent is extended or adjusted under 35 U.S.C. 154(b) by 198 days.

(21) Appl. No.: 15/496,697

(22) Filed: Apr. 25, 2017

(65) Prior Publication Data

US 2017/0327673 A1  Nov. 16, 2017

Related U.S. Application Data

(63) Continuation of application No. 13/514,899, filed as application No. PCT/EP2009/008766 on Dec. 8, 2009, now Pat. No. 9,663,643.

(51) Int. Cl.
| | |
|---|---|
| *C08L 23/06* | (2006.01) |
| *C08L 23/04* | (2006.01) |
| *C08L 23/08* | (2006.01) |
| *C08L 23/10* | (2006.01) |
| *C08L 23/14* | (2006.01) |
| *C08L 53/00* | (2006.01) |
| *C08L 53/02* | (2006.01) |
| *C08K 3/30* | (2006.01) |
| *C08K 5/01* | (2006.01) |

(52) U.S. Cl.
CPC ............... *C08L 23/06* (2013.01); *C08L 23/04* (2013.01); *C08L 23/0815* (2013.01); *C08L 23/10* (2013.01); *C08L 23/142* (2013.01); *C08L 53/00* (2013.01); *C08L 53/025* (2013.01); *C08K 3/30* (2013.01); *C08K 5/01* (2013.01); *C08L 2666/02* (2013.01); *C08L 2666/04* (2013.01); *C08L 2666/08* (2013.01)

(58) Field of Classification Search
CPC ...... C08L 23/04; C08L 23/06; C08L 23/0815; C08L 23/10; C08L 23/142; C08L 53/00; C08L 53/025; C08L 2666/02; C08L 2666/04; C08L 2666/08; C08K 3/30; C08K 5/01
USPC ........................................................ 524/487
See application file for complete search history.

(56) References Cited

U.S. PATENT DOCUMENTS

| | | | |
|---|---|---|---|
| 5,060,818 | A | 10/1991 | Doi et al. |
| 9,663,643 | B2 | 5/2017 | Coulter et al. |

FOREIGN PATENT DOCUMENTS

| | | |
|---|---|---|
| EP | 0250057 A2 | 12/1987 |
| EP | 0503124 A1 | 9/1992 |
| EP | 0328337 B1 | 1/1994 |
| EP | 1116747 A1 | 7/2001 |
| EP | 1050556 B1 | 6/2006 |
| EP | 1816086 A1 | 8/2007 |
| EP | 1894974 A1 | 3/2008 |
| EP | 2058379 A1 | 5/2009 |
| JP | 2002080647 A * | 3/2002 |
| WO | WO-0114219 A1 * | 3/2001 ............. B65D 41/62 |

OTHER PUBLICATIONS

English language machine translation of JP 2002-080647 (Year: 2002).*
International Search Report and Written Opinion for International Application No. PCT/EP2009/008766, European Patent Office, Netherlands, dated Mar. 16, 2010, 11 Pages.

* cited by examiner

*Primary Examiner* — Angela C Scott
(74) *Attorney, Agent, or Firm* — Sterne, Kessler, Goldstein & Fox P.L.L.C.

(57) ABSTRACT

PVC-free polymer compound for producing seals containing scavengers for screw caps, in particular twist crown corks, characterized in that the Shore A hardness of the polymer compound lies between 50 and 90 and, in a compression set test analogous to ASTM D395-97, Method B, the polymer compound has a compression set of between 30% and 90% after it has been left for 22 hours at 70° C. under a compression of 25%.

19 Claims, No Drawings

SEALING COMPOUNDS WITH SCAVENGER MATERIALS OF SMALL PARTICLE SIZE

The invention relates to a PVC-free polymer compound for producing scavenger-containing seals or liners for screw caps, in particular twist crown corks.

Oxygen-sensitive foods and beverages around the world have a great brand significance. In this context, beer, fruit juices and tea-based beverages have to be mentioned in the first place. To keep these filling goods unchanged in terms of taste and composition for as long as possible, the packaging industry has developed a range of technologies.

In traditional bottles with metal closures, for example, barrier technologies as described in EP-0503124 A1 are preferably used. In addition, also oxygen-depleting compounds as described in EP-0328337 B1 are utilized. Both technologies are used for sealants of crown caps, but are restricted to use in so-called pry-off crown caps so far.

In the case of bottles made of PET and similar plastics, however, mono- or multilayer composites which should increase the oxygen barrier of the PET are applied. Common polymers in these cases are special polyamides or ethylene vinyl alcohol polymers (EVOH). In addition, also here oxygen-scavenging compounds can be introduced in one of the layers. As an alternative with a passive barrier, extremely thin coatings of carbon or silicon oxides can be applied in the bottle interior.

Twist crown caps are advantageous compared to the conventional crown caps for the consumer because they can be opened without tools. Usually, twist crown caps are produced from PVC-containing compounds in industry, because only then the strict requirements on the tightness on the one hand and the opening forces on the other hand are ensured. The tightness of the twist crown cap must avoid leakage of the fill content and contamination of the filling good. However, it must be guaranteed that the container can be opened without too much effort by a rotary movement of the twist crown cork, but does not open undesired. As an additional requirement for the seal, it must also be ensured that the opening and closing may be repeated as often as desired without a loss of the tightness and/or the opening forces.

It is advantageous to use compounds for seals of container closures which do not contain PVC components, neither in the form of PVC in general nor in the form of flexible PVC in particular. In the conventional incineration of household waste, halogen-containing plastics generate acidic gases whose escape into the atmosphere is harmful. In addition, even small amounts of PVC impede the mechanical recycling of plastic waste. Moreover, such PVC-based sealing elements require the use of plasticizers, which are also undesirable for health reasons.

There is therefore a need for twist-crown closures, which have a polymer-based sealing insert and comprise an oxygen-depleting component, which insert is not based on PVC.

With all these characteristics, the seals must also comply with the above-mentioned requirements concerning the possible migration of their chemical constituents.

Thus, it is one major objective of the invention to provide a sealing insert or liner for the manufacture of twist-crown closures, which allows equipping of the container closure with a polymer-based sealing element which has an oxygen-scavenging component, does not contain PVC, complies with legal regulations concerning the migration and meets the directives in regard to testing for extraneous flavors (off-flavors).

The formulation according to the invention allows the production of twist crown caps that on the one hand meet the requirements in regard to the tightness and the opening force and on the other hand comprise an oxygen-depleting component, but do not consist of PVC.

To achieve this and other objects, a sealing insert for twist crown corks according to the invention is provided with the features as defined in claim 1. Advantageous embodiments are defined in the dependent claims.

We have surprisingly found that certain compounds with a suitable Shore A hardness, and preferably based on TPE, polyolefin, and white oil, meet these mentioned requirements particularly well.

We have further found that substances such as ascorbic acid and other compounds known in the art are suitable to be used as an acceptable additive to create an oxygen barrier for twist crowns and the oxygen-scavenging functionality can thus be optimized. We have also found that sulfites, especially metal sulfites, and in particular sodium sulfite, are a suitable additive to create the above-mentioned oxygen barrier for twist crown caps.

A compound for a seal for a twist crown cap, to which sulfite was added as an oxygen-scavenging component, must of course also comply with the corresponding standards e. g. regarding a off-flavor test according to DIN 10950, as described in the "Leitfaden Verschlüsse" (guideline for closures) of the Packaging Technology Department of the TWA (Technical Scientific Committee) of the VLB Berlin (Berlin, March 2009).

We have found that it is possible to control the functionality of the oxygen-scavenging component (especially of the sulfite) via the average particle size. By reduction of the particle size and accompanying enlargement of the inner surface, the availability of active agent (e.g. sodium sulfite) is increased, since the sodium sulfate resulting from the reaction at the outer side of the scavenger particle forms a diffusion barrier for further oxygen and thus increases the barrier effect. So, the necessary amount of additive can be minimized. The activity of the scavenger particles can be modified using various additives, as also described in patent EP-1050556 B1.

The polymer compounds for seals for twist crown caps according to the invention also achieve the reduction of oxygen ingress in comparison with a scavenger-free reference material. The oxygen ingress into the filling good was determined by the "Total Package Oxygen" method (Orbisphere technology). For this, bottles are filled with a beer simulant (in terms of pH and $CO_2$ content) in a glove box and the total oxygen content is measured non-destructively. Even after 150 days, ingress of less than 0.4 ppm oxygen can be achieved. An oxygen-induced taste effect is usually assumed at concentrations above 1 ppm. So, in comparison with the scavenger-free reference material, a reduction of oxygen ingress by a factor of 3 can at least be achieved.

In the herein-described twist crown caps, the sealing element is formed as a deposit on the inner surface of the container closure, similarly as it is the case for the known PVC-containing twist crowns.

The formulation according to the invention permits the production of PVC-free sealing compositions for twist crowns, which are equipped with at least one oxygen-depleting component.

Moreover, the formulation according to the invention permits the production of a sealing compound for twist crowns which can be foamed by chemical or physical blowing agents.

In preferred embodiments, the compound comprises between 2% to 20% copolymer consisting of polypropylene (PP) and polyethylene (PE), more preferably the material comprises between 5% to 15% copolymer.

In special preferred embodiments, the compound comprises between 5% to 25% polyethylene (low-density polyethylene, LDPE), more preferably the material comprises between 10% to 20% LDPE.

In other preferred embodiments, the compound comprises not more than 10%, preferably not more than 7%, more preferably not more than 4% and even more preferably not more than 1% of lubricants.

In further preferred embodiments, the compound comprises between 10% to 40% thermoplastic elastomers based on styrene-ethylene-butylene-styrene (SEBS), and more preferably the material comprises between 20% to 30% of TPE based on SEBS.

Preferably, the compound comprises between 20% to 45% medicinal white oil, and particularly preferably, the material comprises between 30% to 40% medicinal white oil.

In additionally preferred embodiments, the compound comprises between 10% to 30% polyethylene (linear low-density polyethylene, LLDPE), preferably the material comprises between 15% to 25% LLDPE.

In preferred embodiments, the compound comprises between 1% to 10% sodium sulfite, preferably the material comprises between 4% to 8% sodium sulfite.

In other preferred embodiments, the compound comprises between 20% to 100% of at least one block copolymer, wherein the block copolymer preferably is an interpolymer of ethylene and at least one $C_3$-$C_{20}$ alpha-olefin, or a copolymer of ethylene and one $C_3$-$C_{20}$ alpha-olefin or of ethylene and one $C_3$-$C_{20}$ alpha-olefin in case in combination with other unsaturated monomers.

Furthermore, it is preferred that the material of the sealing insert comprises no plasticizers.

According to the invention, said material has a Shore A hardness of 50-90, preferably a Shore A hardness of 60-80 and more preferably of 65-76.

It is also preferred that the polymer compounds exhibit a compression set between 20% to 90%, preferably between 30 to 60%, and more preferably between 40% to 50% in the compressive deformation test analogous to ASTM D395-97 Method B after 22 hours of storage at 70° C. and a compression of 25%.

According to the invention, the average particle size of the sodium sulfite is adjusted to smaller than 20 μm, preferably smaller than 12 μm and particularly preferably smaller than 7 μm.

According to the invention, the selection of the polymer compounds for the twist crowns should be carried out in such a way that constant, low opening values in the range of 0.678 Nm (6 lbf·in) to 1.130 Nm (10 lbf·in) with a target value of 0.791 Nm (7 lbf·in), according to the Packaging Technology Department of the TWA of the VLB, can be reached.

The polymer compounds for seals for twist crowns according to the invention can maintain a pressure of more than 8 bar after pasteurization (determined on Secure Seal Tester from the company Secure Pak).

It should be noted that the parameters of the opening forces, as well as of the pressure maintenance and the oxygen entry, are dependent on the width of the bottle opening and the sealing profile which might be provided.

Optionally, pigments can be added to the formulations of the compounds.

It has also been shown that other additives such as waxes and silicones may be added to the polymer compound, for example to improve processing and performance characteristics.

| An exemplary formulation comprises: | |
|---|---:|
| PE/PP copolymer: | 8% |
| LDPE polyethylene: | 10% |
| Erucic acid amide: | 0.5% |
| Stabilizer: | 0.1% |
| Antioxidant: | 0.1% |
| SEBS (fixed styrene content 31%): | 25% |
| White oil: | 34% |
| Sodium sulfite (anhydrous): | 6% |
| LLDPE polyethylene: | 16.3% |

EXAMPLES

The oxygen uptake was determined by the "Total Oxygen" method (Orbisphere technology). For this, bottles are filled with a beer simulant (in terms of pH and $CO_2$ content) in a glove box and the total oxygen content is measured non-destructively.

"Total package Oxygen (ppm)" in this context is the total concentration of oxygen in the filling container (bottle).

"Pasteurized" means that the beer simulans has been pasteurized before closing.

| Actega PVC-free oxygen test of Miller twist-off bottles (U.S.) with and without pasteurization | | | | |
|---|---|---|---|---|
| Days | A [ppm] | B [ppm] | C [ppm] | D [ppm] |
| 6 | 0.097 | 0.051 | 0.086 | 0.051 |
| 26 | 0.220 | 0.098 | 0.215 | 0.132 |
| 53 | 0.247 | 0.158 | 0.265 | 0.141 |
| 94 | 0.614 | 0.253 | 0.689 | 0.306 |
| 146 | 1.130 | 0.309 | 1.231 | 0.298 |
| 181 | 1.244 | 0.218 | 1.493 | 0.325 |

A: Svelon TC VP 642394 white
B: Svelon TC VP 849189 T/A
C: Svelon TC VP 642394 white—pasteurized
D: Svelon TC VP 849189 T/A—pasteurized
Svelon TC VP 642394 white does not contain sodium sulfite/Svelon TC VP 849189 T/A contains sodium sulfite, the material composition is otherwise identical
In all experiments, the same amount of material from Svelon TC VP 642394 white/Svelon TC VP 849189 T/A was used

The invention claimed is:

1. A polymer-based composition for a PVC-free sealing insert for a twist crown cap, comprising:
    at least one oxygen-scavenging substance;
    at least 20% of at least one block copolymer, wherein the block copolymer is an interpolymer of ethylene and at least one $C_3$-$C_{20}$ alpha-olefin or a copolymer of ethylene and one $C_3$-$C_{20}$ alpha-olefin, optionally in combination with other unsaturated monomers;
    wherein the Shore A hardness of the polymer-based composition is between 50 to 90 and the polymer-based composition exhibits a compression set of 30-90% in the compressive deformation test analogous to ASTM D395-97 Method B after 22 hours of storage at 70° C. and a compression of 25%.

2. The polymer-based composition according to claim 1, wherein the polymer-based composition comprises thermoplastic elastomer, polyolefin and white oil.

3. The polymer-based composition according to claim 1, wherein the polymer-based composition is free of plasticizer.

4. The polymer-based composition according to claim 1, wherein the polymer-based composition has a Shore A hardness of 60 to 80.

5. The polymer-based composition according to claim 1, wherein the oxygen-scavenging substance is sodium sulfite having an average particle size smaller than 20 μm.

6. The polymer-based composition according to claim 1, wherein the polymer-based composition comprises between 1% to 10% sodium sulfite as oxygen-scavenging substance.

7. The polymer-based composition according to claim 1, wherein the polymer-based composition exhibits a compression set between 30% to 60% in the compressive deformation test after 22 hours of storage at 70° C. and a compression of 25%.

8. The polymer-based composition according to claim 1, wherein the polymer-based composition comprises between 2% to 20% copolymer consisting of polypropylene and polyethylene.

9. The polymer-based composition according to claim 1, wherein the polymer-based composition comprises between 5% to 25% low-density polyethylene.

10. The polymer-based composition according to claim 1, wherein the polymer-based composition comprises not more than 10% of lubricants.

11. The polymer-based composition according to claim 1, wherein the polymer-based composition comprises between 10% to 40% thermoplastic elastomers based on styrene-ethylene-butylene-styrene having a fixed styrene content of 31%.

12. The polymer-based composition according to claim 1, wherein the polymer-based composition comprises between 20% to 45% white oil.

13. The polymer-based composition according to claim 1, wherein the polymer-based composition comprises between 10% to 30% linear low-density polyethylene.

14. The polymer-based composition according to claim 1, further comprising an additive selected from the group consisting of waxes, silicones, and combinations thereof.

15. The polymer-based composition according to claim 1 which can be foamed by chemical or physical blowing agents.

16. A sealing insert for a twist crown cap comprising the polymer-based composition according to claim 1.

17. A sealing insert for a twist crown cap comprising the polymer-based composition according to claim 1 which exhibits opening values in the range of 0.678 Nm (6 lbf·in) to 1.130 Nm (10 lbf·in) with a target value of 0.791 Nm (7 lbf·in) before and after the pasteurization.

18. A sealing insert for a twist crown cap comprising the polymer-based composition according to claim 1 which exhibits a pressure maintenance of higher than 8 bar after pasteurization.

19. A container closure with a sealing insert which comprises the polymer-based composition according to claim 1.

* * * * *